July 11, 1950 W. T. PIGOTT 2,515,136
METHOD OF MELTING POLYMERS
Filed July 18, 1947
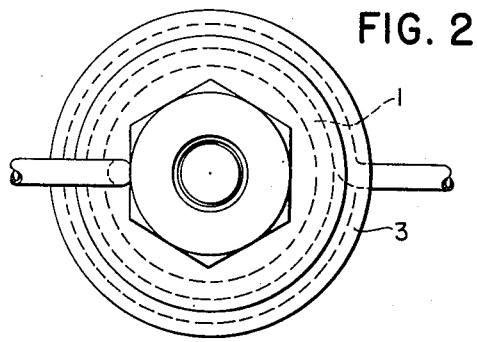
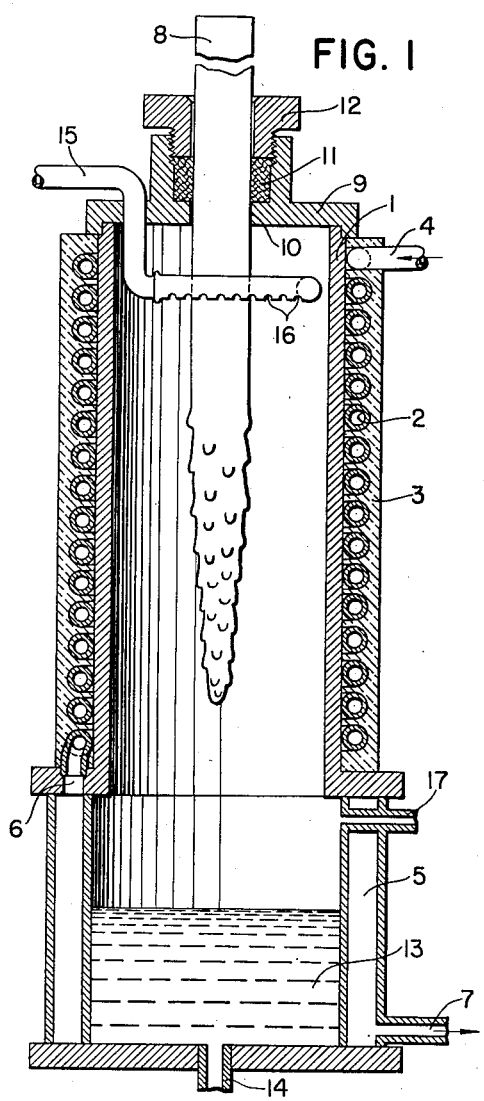
INVENTOR.
WILLIAM T. PIGOTT
BY
*R. H. Waters*
ATTORNEY Patented July 11, 1950

2,515,136

UNITED STATES PATENT OFFICE 2,515,136

METHOD OF MELTING POLYMERS

William T. Pigott, Akron, Ohio, assignor to Wingfoot Corporation, Akron, Ohio, a corporation of Delaware Application July 18, 1947, Serial No. 761,859

3 Claims. (Cl. 18—48)

This invention relates to a method of melting difficultly fusible condensation polymers, such as the superpolyamides and superpolyesters, and especially the fiber-forming types, which melt at temperatures only slightly below the decomposition temperatures of the polymers. The invention also relates to a furnace structure useful in practicing the method.

The polyamides and polyesters which are used in the practice of this invention are high molecular weight condensation polymers prepared from relatively simple polyfunctional compounds, such as polybasic acids, glycols, amino acids, diamines, amino alcohols, hydroxy acids, and lactams, selected and proportioned so as to form long ester and/or amide chains by inter-reaction. These compositions are well known and widely used in the manufacture of synthetic fibers. Many of these fiber-forming polymers, and especially the more desirable ones of high molecular weight, have very high melting points and when melted do not become very fluid. Many such compounds cannot be heated to higher temperatures for the purpose of reducing the viscosity because of the narrow temperature range between the softening point and the decomposition temperature.

Prior to this invention, the linear polymers were melted by contacting them in the form of chips or granules, with a heated perforated grid from which the heat passed to the polymers by conduction. Due to the viscosity and the low conductivity of the molten polymer, it was necessary to use very large grids in order to render them effective in production operations.

The primary purpose of this invention is to provide a novel method of melting the condensation polymers by which production quantities of polymer may be conveniently melted without danger of decomposition through excessive heating.

The invention involves heating the polyamide, polyester or other polymer by means of radiation whereby large quantities of heat may be transferred at a low temperature differential, thus enabling the melting of more polymer per unit of furnace volume. This method of heat transfer is particularly effective because of the heat-absorptive nature of the molten polymer surface and the fact that the usual necessity for transferring heat through the polymer, which is a good heat insulating material, is avoided.

The invention is described with reference to the accompanying drawings, in which Fig. 1 is an elevation in section of one modification of the apparatus for practicing the new invention, which modification is useful in melting polymer which has been previously cast in elongated shapes, preferably of circular cross-section, and Fig. 2 is a top plan view of the structure shown in Fig. 1.

The design and operation of the illustrated modification of this invention, which utilizes polymer prepared in rod form is set forth in particular detail with respect to Figs. 1 and 2 wherein a cylindrical furnace 1 is surrounded by a helical tube 2, preferably of metal, which is covered by a suitable layer of heat insulation 3. The helical tube is adapted to conduct a suitable transfer liquid, such as diphenyl, and therefore is connected with a source of the heating medium at inlet 4. The heating medium passes downwardly thru the helical tube and enters the annular space 5 in the lower part of the furnace thru the connection 6. A substantial proportion of the heating medium is retained in the space 5 from which it passes thru exit 7 to a suitable heating means (not shown).

The solid polymer is charged to the furnace as a solid rod 8 of any desired length. The rod passes thru the top of the furnace 9 thru an aperture 10. It is necessary that the space between the rod surface and the furnace top be sealed to prevent the entrance of air from outside the furnace and accordingly the top 9 is provided with a stuffing box 11 filled with a suitable packing material and enclosed by threaded gland 12. The solid polymer is melted by radiation from the furnace walls and drops in liquid form into the reservoir 13 from which it is drawn off as desired through vent 14.

It is usually desirable and frequently necessary to maintain the atmosphere in the interior of the furnace free from oxygen. Accordingly, a source of an inert gas, such as nitrogen, is provided by conduit 15 which enters the furnace near the top and contains a series of small apertures 16 for the purpose of distributing the inert gas throughout the upper portion of the furnace. The inert atmosphere sweeps downwardly through the furnace and passes out through the exit 17. The objectionable gases may be forced out of the chamber by positive pressure of the inert gas entering, or they may be drawn out by means of a suitable vacuum pump (not shown).

The accompanying drawings illustrate only one modification of the invention, of which a wide variety of designs may be devised. In the preferred forms, the heating surface is disposed around the body of the polymer and is of considerably larger area than the surface area of the body of the polymer to be heated. It is generally desirable to utilize a heating area at least five times as great as the surface area of the polymer rod. The preferred practice utilizes a heating area of 10 to 200 times the area of the surface of the polymer body and furnaces may be designed utilizing area ratios up to a thousand. It will be apparent that, when polymers having a narrow range between the melting point and the decomposition point are being used, higher furnace area ratios will be required.

The temperature used in the practice of this invention will obviously vary with the physical characteristics of the polymer to be melted. A temperature sufficiently above the melting point should be used to achieve a desirable low viscosity, but the temperature should be maintained below that which will cause the decomposition of the polymer. The heat transfer medium must be selected to be useful at the desired temperature, so that the polymer is fluid and the temperature differential between the furnace wall and the surface of the polymer being melted is substantial. Since the polymer may be in contact with the furnace walls in the lower portion of the furnace, it is generally desirable to maintain the heat transfer medium at a temperature below the point at which the polymer begins to decompose.

Although the preferred modifications of this invention involve the use of a liquid heat transfer medium, it should be apparent that other heating means may also be used. Structures utilizing electric heating means are very effective.

Although the invention has been described with respect to specific embodiments, the details thereof should not be construed as limitations upon the scope of the invention except to the extent incorporated in the following claims.

I claim:

1. A method for melting a solid polymer of the group consisting of linear polyamides, linear polyesters and linear polyester-amides which comprises suspending a rod of said polymer in a heated tubular furnace, heating the rod solely by radiation from said tubular furnace and allowing the melted polymer to drop off the rod into a receiver.

2. A method according to claim 1 in which the heated walls of the furnace have an area at least five times that of the polymer rod.

3. A method according to claim 1 in which the heated walls of the furnace have an area from ten to 200 times that of the polymer rod.

WILLIAM T. PIGOTT.

REFERENCES CITED

The following references are of record in the file of this patent:

UNITED STATES PATENTS

| Number | Name | Date |
|---|---|---|
| 2,117,497 | Owens et al. | May 17, 1938 |
| 2,295,942 | Fields | Sept. 15, 1942 |
| 2,340,834 | Hanson | Feb. 1, 1944 |
| 2,409,521 | Wiley | Oct. 15, 1946 |
| 2,432,668 | Kingston | Dec. 16, 1947 |